United States Patent

[11] 3,564,209

[72] Inventor Henry Loughnane
Little Falls, N.J.

[21] Appl. No. 697,555
[22] Filed Dec. 27, 1967
[45] Patented Feb. 16, 1971
[73] Assignee Tech Laboratories, Inc.

[54] DATA STORAGE AND QUICK RETRIEVAL UNIT
9 Claims, 11 Drawing Figs.

[52] U.S. Cl. .......... 235/61.7, 353/26; 355/41
[51] Int. Cl. .......... G03b 23/12, G03b 27/52, G06k 17/00
[50] Field of Search .......... 353/25, 26; 355/40, 41; 235/61.7; 340/339; 340/174.1 (C)

[56] References Cited

UNITED STATES PATENTS

| | | | |
|---|---|---|---|
| 2,323,372 | 7/1943 | Bryce | 353/26 |
| 2,782,398 | 2/1957 | West et al. | 340/174.1C |
| 2,923,921 | 2/1960 | Shapin | 340/174.1C |
| 3,290,987 | 12/1966 | James et al. | 353/26 |
| 3,191,006 | 6/1965 | Avakian | 235/61.7 |
| 3,273,450 | 9/1966 | Ede et al. | 353/26 |
| 3,322,030 | 5/1967 | Silverman | 355/41 |

*Primary Examiner*—Maynard R. Wilbur
*Assistant Examiner*—Thomas J. Sloyan
*Attorney*—Magnus Bjorndal

ABSTRACT: A microfilm retrieval apparatus for information arranged on microfilm in rows of pictures separated by transverse binary coded arrays of light and dark bit areas forming a plurality of code words corresponding to a "book" number and alphabetical letters. The apparatus has a keyboard with 26 "letter" key switches and a group of numbered "book" key switches. Data is punched into the apparatus in several steps, first by actuating a "book" key and then by sequentially actuating first and second "letter" keys. The first and second input steps encode respective first and second binary words in memory modules, there being one module for each bit. At this point, the film is moved by drive means in the proper direction, as sensed by photocells receiving light through the coded arrays on the film strip, and the film stops when the photocells sense film bits corresponding with those encoded in the corresponding memory modules by a third key actuation step, to move the strip to a final position, as determined by photocells responding to a corresponding transverse coded bit array on the strip.

INVENTOR
HENRY LOUGHNANE
BY M. Bjanda
ATTORNEY

INVENTOR
HENRY LOUGHNANE
BY [signature]
ATTORNEY

INVENTOR
HENRY LOUGHNANE
BY [signature]
ATTORNEY

INVENTOR
HENRY LOUGHNANE
BY [signature]
ATTORNEY

INVENTOR
HENRY LOUGHNANE
BY [signature]
ATTORNEY

INVENTOR
HENRY LOUGHNANE
BY M. Bjamder
ATTORNEY

DATA STORAGE AND QUICK RETRIEVAL UNIT

The present invention relates in general to the field of storage and rapid retrieval of information, and, in particular, provides apparatus capable of the high speed handling of information in various forms, preferably on microfilm.

The present invention furthermore is similar to that shown in U.S. Pat. No. 3,292,006, except that it is greatly simplified in the coding and the electronic operation of the retrieval mechanism. It is also very much different in the control of the drive mechanism, and a much smaller proportion of the film is used for coding than in the patent mentioned.

The present invention is also a further improvement of the art in the fact that is it has been simplified to the extent that a complete apparatus containing over 56,000 pages of information can be placed in a small, portable unit in a case approximately 13 inches × 18 inches × 19 inches. It has been found in modern times that it is becoming more and more essential to businesses, schools, researchers, the government, and others because the tremendous amounts of information developed in this country, that equipment for storage and retrieval of such knowledge be available and be capable of searching and retrieving the desired information in a few seconds. In the present case it is possible to retrieve any one of 9,000 pages in the average time of 4 seconds. It is obvious, therefore, that the rapid and automatic handling of information becomes of the greatest importance. It is also obvious that if such a machine shall become used in all the places where it is desired, it will have to be low priced.

The main object of may invention is, therefore, to store and quickly retrieve large numbers of information units, which is preferably done by employing a micro-image, scroll-type storage medium with a plurality of information units stored in parallel on said scroll and with automatic electronic means operable through a keyboard for the scanning and selection of any one of the stored units.

Another important object of my invention is to provide a data storing and retrieving unit which has electronic searching and locating means for locating the line on which the information is available and with manually operable means for selecting he proper unit of information located in this line.

An ancillary object of my invention is to provide a device which may be operated by anyone and which will quickly locate any one of tens of thousands of items of information in a minimum amount of time.

Another object of my invention is to provide an apparatus of simple construction and low cost, which can be used by anyone without any special training.

Other objects and advantages of the invention will be apparent during the course of the following description. In the accompanying drawings forming a part of this specification, and in which like numerals are employed to designate like parts throughout the same, FIG. 1 is a perspective view of the finished unit;

Figure 10:
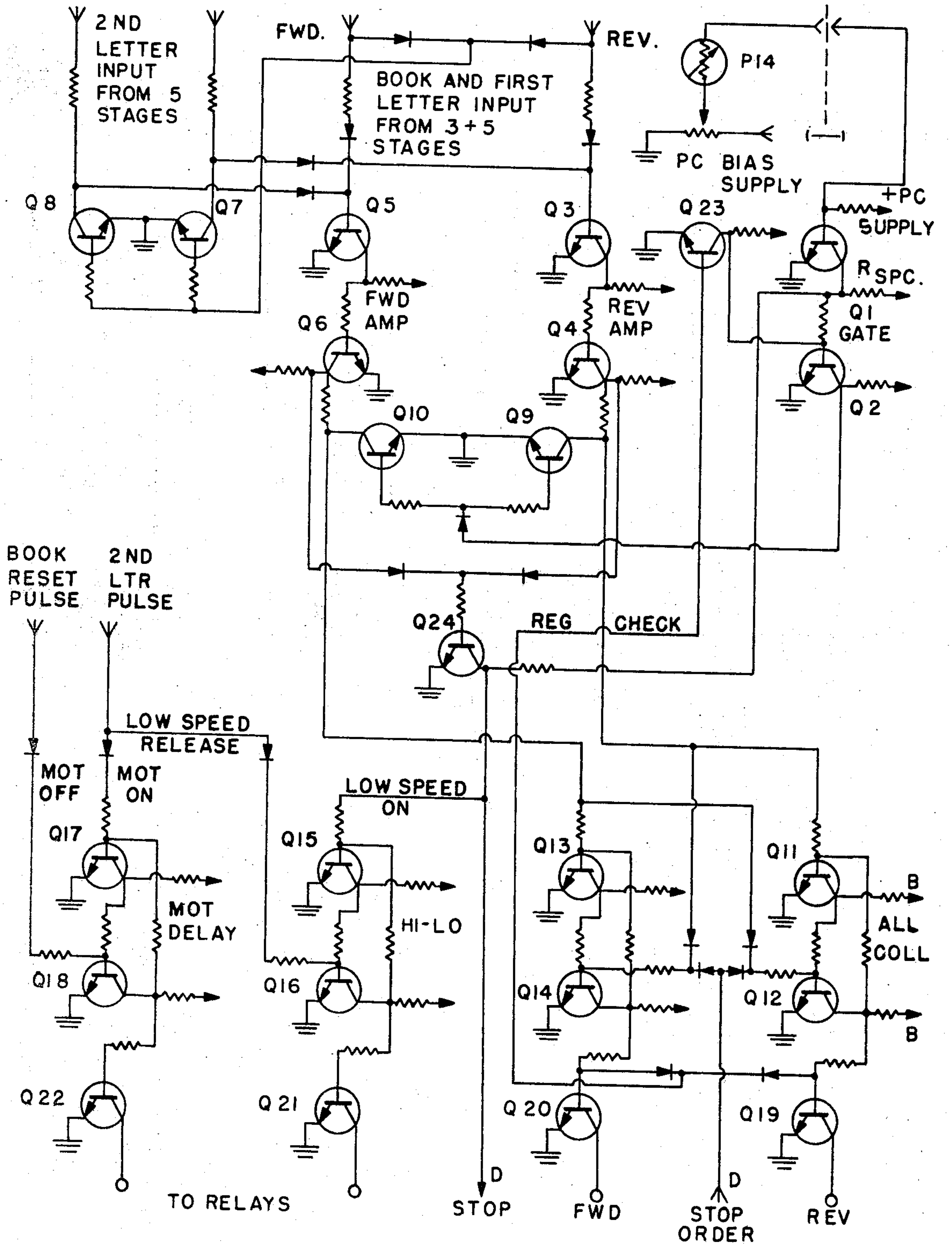
FIG. 10 shows the gate control for any letter, or any book.

In the drawings, wherein for the purpose of illustration, is shown a preferred embodiment of my invention, the numeral 15 designates the case, where 16 is the keyboard. The knob at the upper left-hand side of the keyboard designated 17 is the dimmer switch which serves to cut down the wattage of the projector lamp when the same is not in use. This lamp is preferably a 35 watt, 12 volt automotive lamp which gives an excellent amount of light, has a long life, and is of low cost. On the right-hand side of the keyboard there is a knob 18 which controls a three position switch, the positions of which are "off," "automatic," and "scanning." Above the keyboard is mounted the screen 19 with a hood 20 which protects same from stray light. On the left-hand side of the screen is a knob 21 which controls the position of the film relation to the screen. On the standard unit there are nine rows of microfilm pictures running in parallel on a strip of film that is 105 mm. wide. Knob 21 serves to select which one of these nine pictures is desired on the screen for any row automatically selected by the apparatus. It is obvious that instead of having nine microfilm pictures in parallel, one may also use the machine for any other number of pictures from one up. This can be determined in each case upon the consideration of the operations to be made.

Above the row selector 21 there is another small handle 22 which is movable in a horizontal direction and serves to accurately focus the projection lens.

Figure 5:
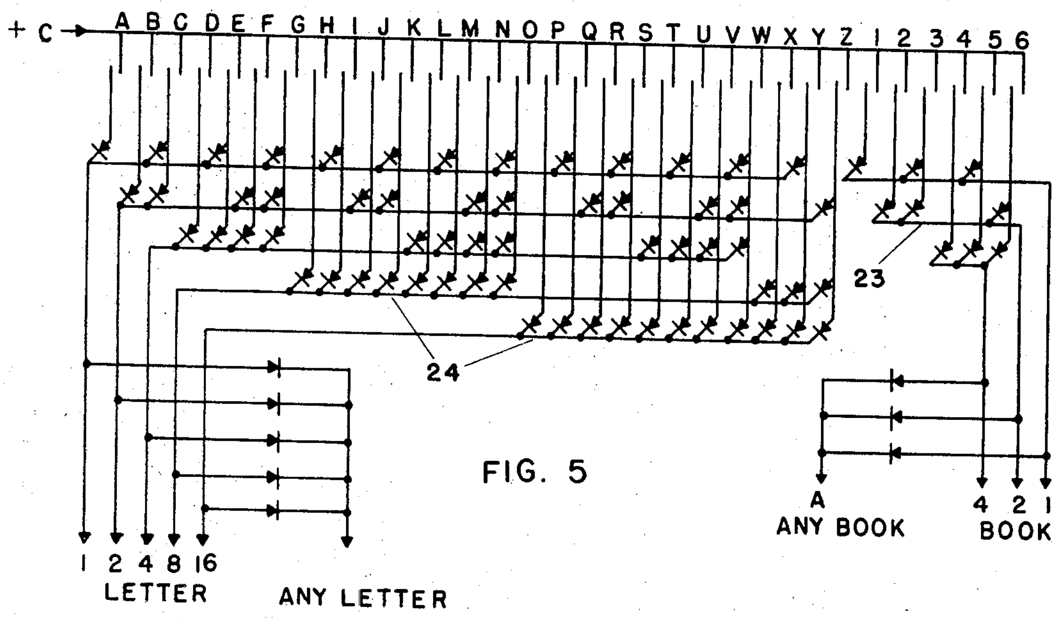
FIG. 5 is a wiring diagram of the matrix units for the selection of books and letters, as hereinafter described.
Figure 2:
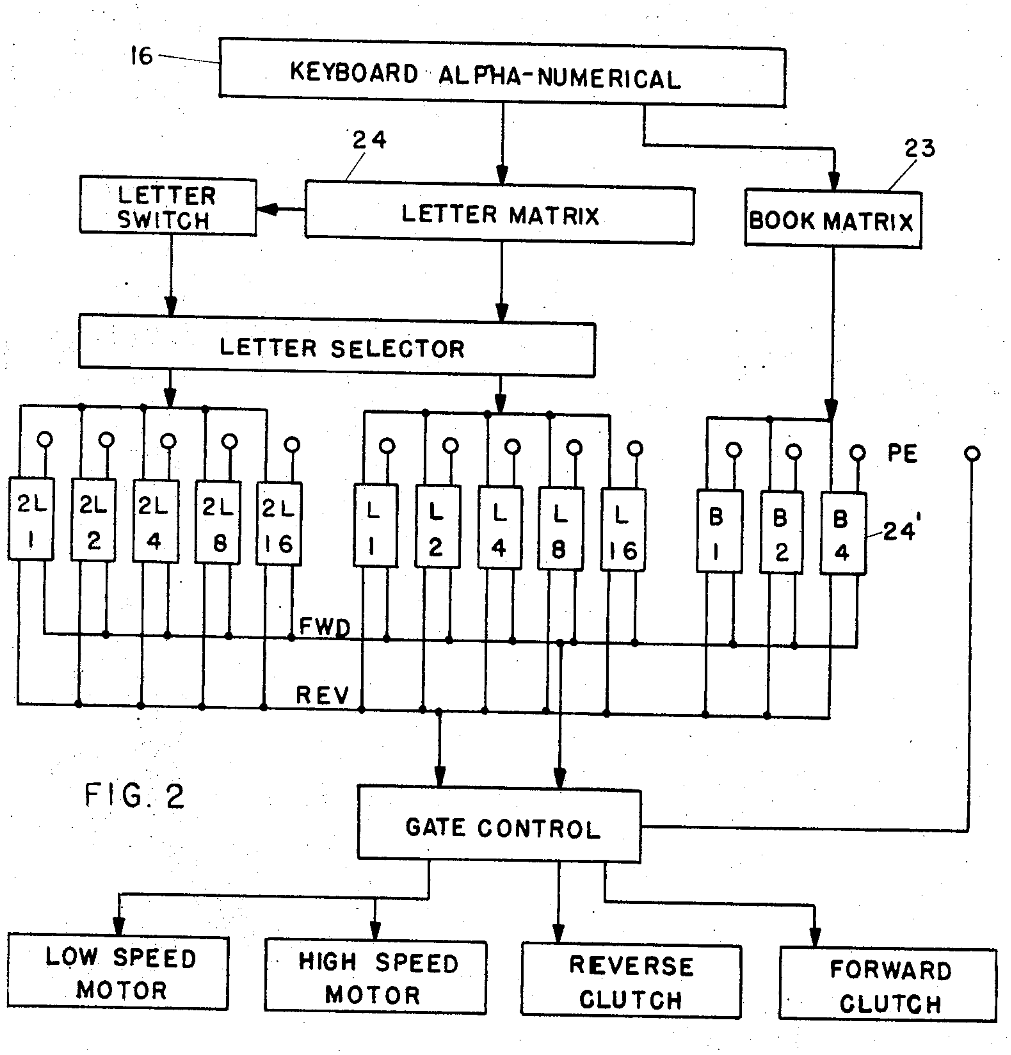
FIG. 2 is a one-line diagram, showing the various elements of the apparatus.
Figure 1:
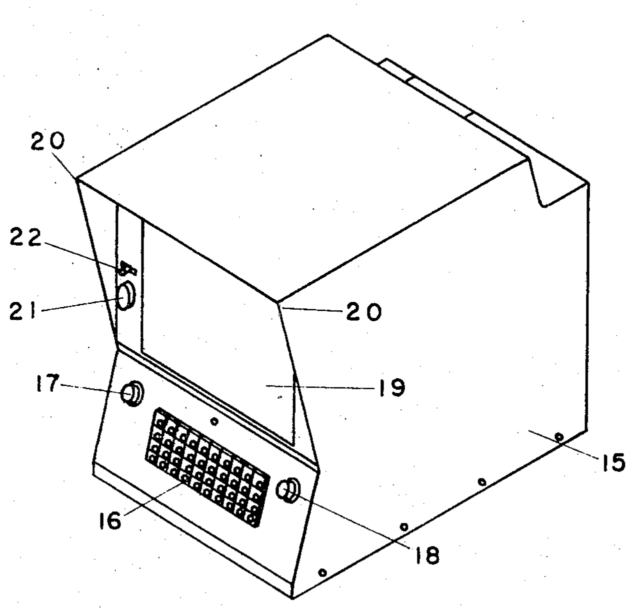

Referring not now to FIG. 2, which is a general, so-called one-line wiring diagram interconnecting the various elements of the apparatus, the keyboard is what is commonly called an "aplhanumerical" board which has 26 keys and which in the present application is connected so as to select the letters of the an alphabetically arranged book. As shown in FIG. 5, the keyboard, in addition to the alphabetic keys, also has 6 keys for the numerical selection of different books, in this case six. If more than six books are desired, a larger number of keys can be added. The six book keys are connected to a standard diode matrix 23 which produces a binary signal which is carried on the three wires designated 1, 2, and 4 in FIG. 5. It is well known that when a subject such as, for instance, names of cities are arranged alphabetically, it is usually necessary only to look for the two first letters. The letter keys are, therefore, designated for punching only the first and second letter of the name to be looked for. These letter keys, as shown in FIGS. 2 and 5, are wired to a standard binary letter matrix 24, which in a well known way converts the signals made by pushing the alphabetical buttons into a binary pulse which is carried forth on the wires marked 1, 2, 4, 8, and 16 in FIG. 5.

Figure 6:
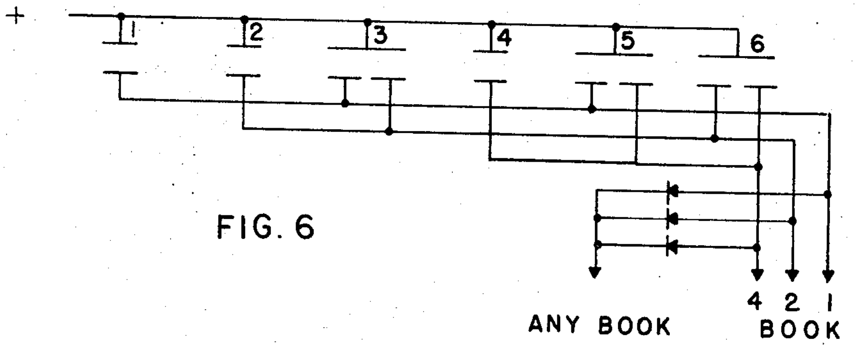
FIG. 6 is a wiring diagram of the book selection but with a matrix included in the switches.
Figure 7:
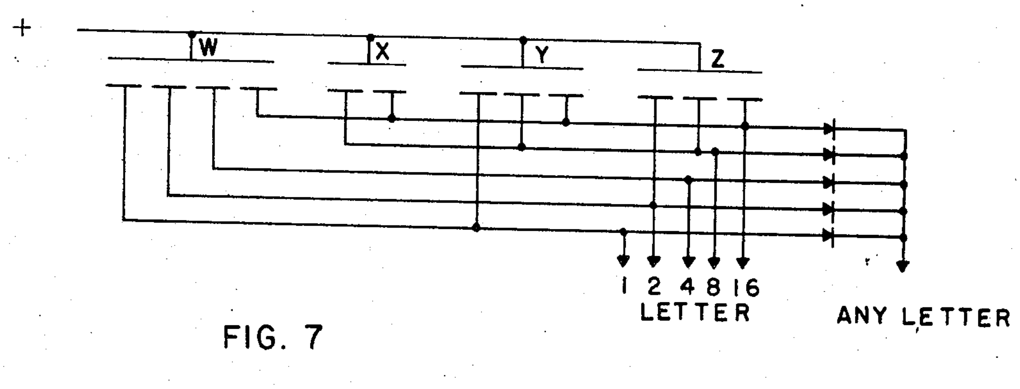
FIG. 7 is a wiring diagram showing the letter selection but with the matrix included in the switches.

It is well known that instead of a diode matrix, multiple contact switches may be used to convert an alpha or decimal input to a binary output. This is illustrated in FIGS. 6 and 7. FIG. 6 shows the wiring for the conversion of the "Book" inputs. FIG. 7 shows the wiring for the conversion of "Letter" inputs.

In this case a switch that engages a common pole with five contacts is used. By a choice of contacts per switch, a voltage that is applied to the common can be made to energize selected binary outputs. For instance, if switch labeled "-Book" 5 is pushed, conductors 4 and 1 are energized. The same method is used for the "Letter" switching, shown in FIG. 7.

Figures 3, 4:
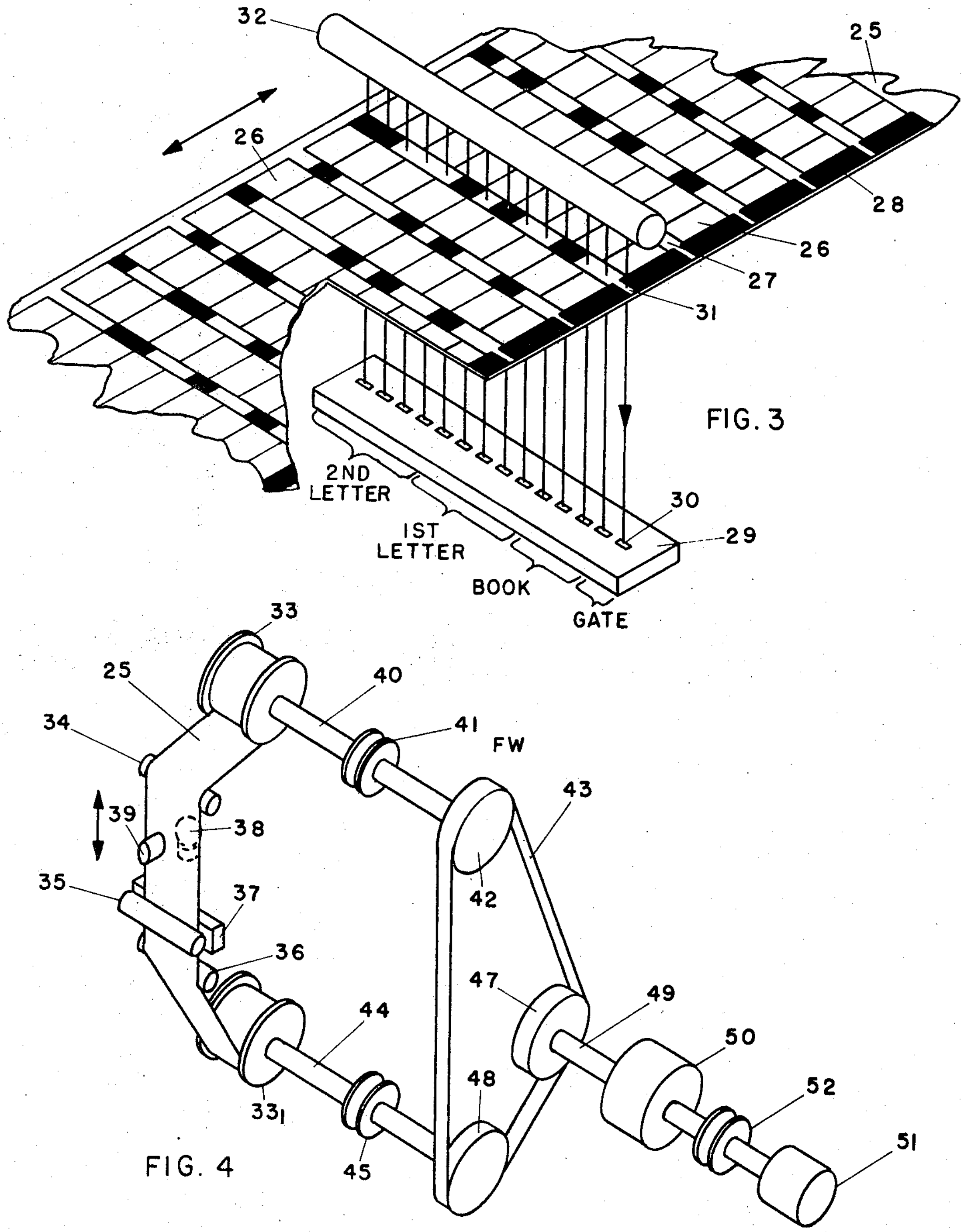
FIG. 3 is a sectional view showing the film, lamp, and photocells in their normal relation.
FIG. 4 is a perspective, schematic view of the scroll drive.

Referring now to FIG. 3, a cutaway portion of the film 25 is shown, having crosswise rows of nine microfilm pictures 26. For each row of nine pictures, there is one row of code 27. In addition there is a row of opaque code markings along to one side 18 28 of the film. These large opaque code markings 28 are for the purpose of gating the operation of the photocells mounted under shield 29. A photocell 30 mounted under shield 29 serves to block the operation of all the other photocells except during the time when the small, transparent section 31 passes under the fluorescent lamp 32. This lamp is a standard white fluorescent lamp of sufficient length to cover the number of photocells used. The photocells 30 are also standard units which are mounted in a row under the shield 29 which protects the cells from any stray radiation. As mentioned before, there is one cell 30 for the gating, three cells for the book, five cells for the first letter, and five cells for the second letter. These cells are so mounted that they can only get light when the coding permits. It is obvious that in different cases the number of cells may be greater or smaller, and there may be a different arrangement without deviating from the present principle.

Referring to FIG. 4, the film 25 is wound upon the scrolls 33 and $33_1$ and may be running off one scroll onto another or vice versa according to the automatic control of the instrument. Various rollers 34, 35, 36, and a guide plate 37 are provided to guide the film as it runs quickly from one to the other spool. A projector lamp 38 and a lens 39 are provided for projecting the picture in position onto screen 19. The scroll 33 is placed upon shaft 40 which has the forward clutch 41 driven by pulley 42 and belt 43. The scroll $33_1$ is mounted on shaft 44 with the reverse clutch 45 driven in the opposite direction by pulley 48 which is driven by the same main drive belt 43 from pulley 47. The main drive shaft 49 is driven by two motors, one a high-speed motor 50 and a low-speed motor 51 with an intervening clutch 52.

Figure 9:
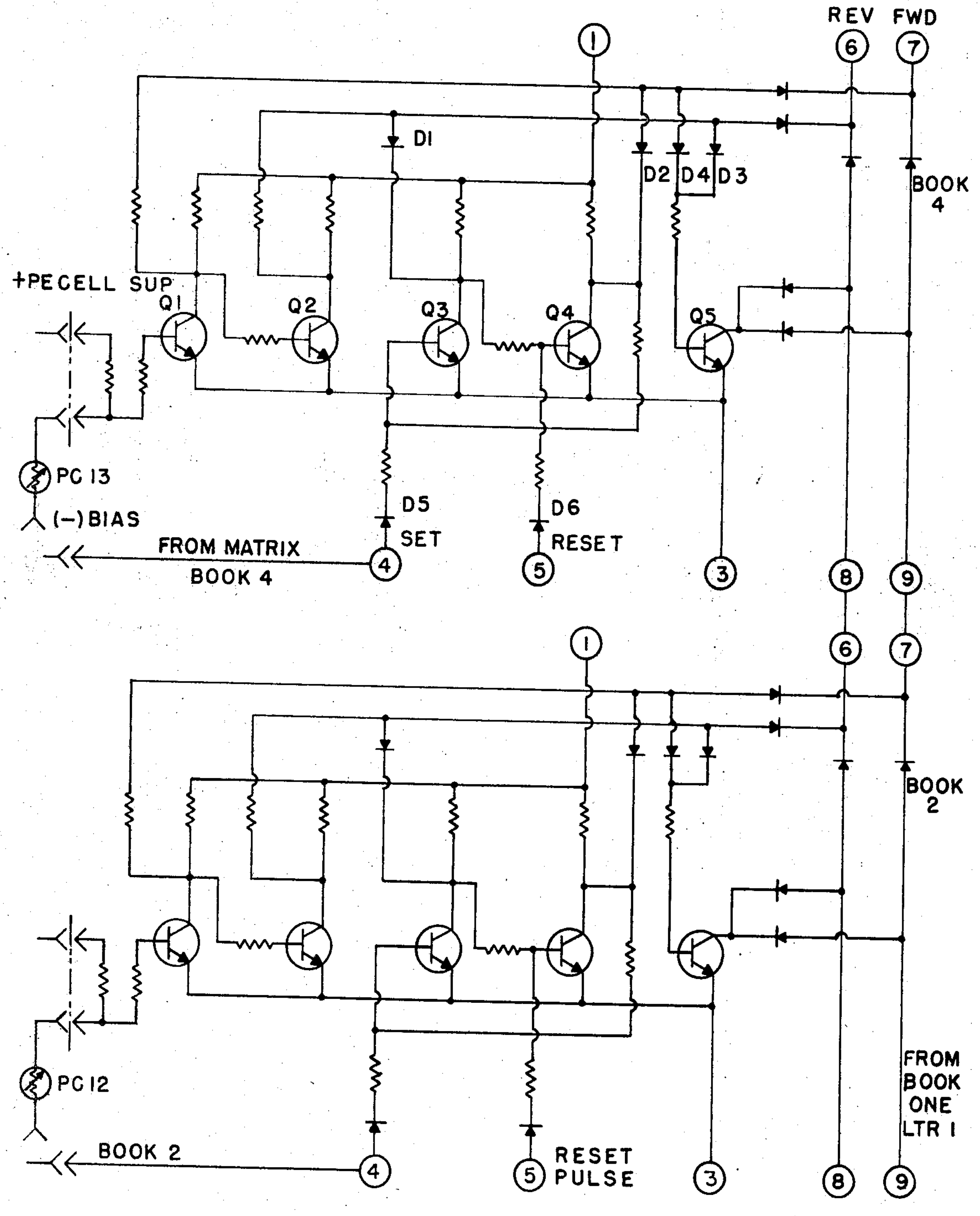
FIG. 9 shows two of the thirteen identical logic systems.
Figure 8:
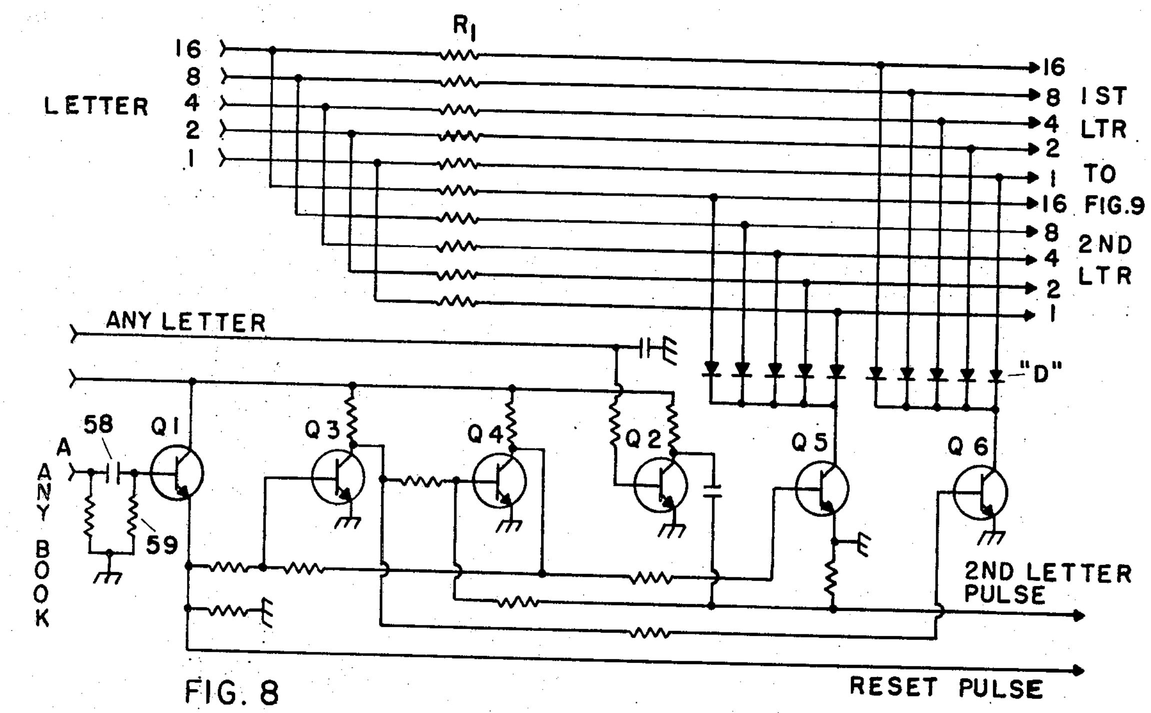
FIG. 8 is a detailed wiring diagram showing the letter selector and letter switch.

Referring now to FIGS. 5 and 8, the wires marked "Book 1,2, and 4" go straight through to the bit modules shown in FIG. 9, while the wire marked "any book A," goes through "any book A" in FIG. 8. This connection carries in the reset pulse which clears whatever is set up on the machine before on all the bit modules. The transistors used are all alike, and the resistors connected between them are of values determined by the characteristics of the transistors used.

To produce a suitable input signal for reset purposes as will be hereafter described, the special circuit with the input "Any Book A," in FIG. 8 is provided. This circuit is of the well known CR-type with the capacitor 58 and two resistors 59 which are calculated to give an impulse of 100 microseconds duration.

The wires from "letters 1, 2, 4, 8, and 16" in FIG. 5 are connected to the wires of the same designation in FIG. 8. These wires going through are resistors R′, which are preferably about 10,000 ohms, but may also be worked out for other values. The wire from "any letter" in FIG. 5 connects to the same wire in FIG. 8. The group of wires marked 1—16 continue straight through R′ and to the bit modules illustrated in FIG. 9. These wires carry the information for the first letter. To obtain a similar circuit for the selection of the second letter, as described below, wires 1—16 are tapped an continue through respective resistors R′ as shown in FIG. 8. Similarly, each one of these wires is tapped and go through diodes D to transistor Q5 and to the second letters pulse wire as shown in FIG. 8 The first five wires are also tapped through similar diodes D and are connected to the input or the transistor Q6 which feeds back to the transistor Q3. Transistors Q3 and Q4 are latching transistors, as will be hereafter described. The reset wire, marked "any letter" on FIG. 5, goes to the wire of the same designation in FIG. 8 and to the transistor Q2. This transistor connects to the second letter pulse wire as shown in FIG. 8.

The memory consists of 13 identical bit modules 24′, one of which is shown in FIG. 9. The various wires described in FIG. 8 connected to the similarly marked input leads in FIG. 9. There are three bit modules for the selection of the books, and ten bit modules for the selection of the first and second letter of the alphabetically arranged subject. If a subject is located in an area having too many similar places, an index is presented instead of the second letter. The operator then selects a key letter from the index and punches same on the keyboard whereupon the correct row is brought forward.

The transistors used on the bit modules shown in FIG. 9 are all alike and the resistors are depending on the type of transistors used.

Referring to FIG. 10 which is the gate control for any book or any letter, the transistors used are again all alike, and the resistors are thus required by the transistors. The circuit is a motor logic that controls the direction and the speed of the film. The forward and reverse signals are carried out as will be described below. It will as also be shown how spurious pulses are eliminated by the use of the special devices.

Figure 11:
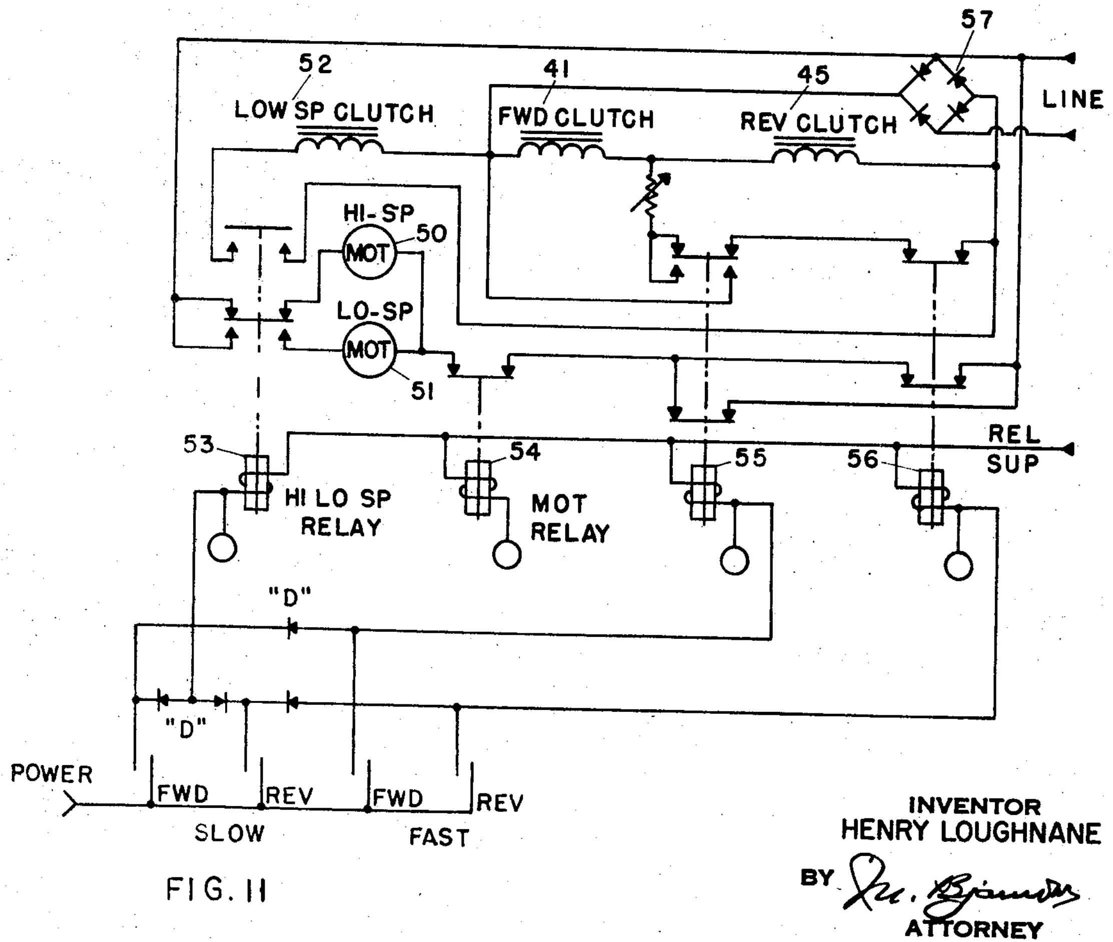
FIG. 11 shows the power supply for the motors, relays, and clutches.

In FIG. 11 is shown how the motors and magnetic clutches are connected with the control relays. To obtain a wide variation of the speed together with instant change from high-speed to low-speed there are provided a high-speed motor 50 and a low-speed motor 51, as shown in this FIG. These two motors are mounted so that one may be used to brake the other when desired. A high-low-speed relay 53 will connect the low-speed clutch 52 and the motor relay 54 will control the motors. A forward clutch 41 controls the forward motion and the reverse clutch 45, the opposite direction. The forward clutch is controlled by relay 55, and the reverse clutch is controlled by relay 56. A rectifier 57 furnishes direct current for the control.

It is obvious from the above that this control and memory circuit could have been done in several slightly different ways. The present design, however, is an optimum design which is the simplest and most satisfactory one both from a production and a servicing point of view. It must also be understood that instead of dividing the system into three groups as I have done here, it may be done in many different ways, and bit modules can be taken away or added to cover different amounts of information.

The operation of my invention is as follows:

Referring to FIGS. 2, 5, and 8, a positive voltage is applied to all the commons of the 32 single pole, single throw switches, preferably of the type commonly called keys. By means of the diodes shown, the letter keys are considered as numerals, with key A equal to 1 and the last key Z equal to 26, the value of each key punched is thus converted to straight binary by passing through the matrix shown in FIG. 5. The conductor labeled "Any Book A" is energized when any numeric key is punched. With the arrangement that a numerical key selecting Book 1, 2, 3, 4, 5, and 6 is first punched and has a two-fold purpose. First of all, current flows through the "Any Book " wire from FIG. 5 to the input wire of the same designation in FIG. 8. This current furnishes an impulse which is of one hundred microseconds duration by the means of the special input circuit having capacitor 58 and resistors 59, FIG. 8. This pulse going through transistor Q1 unlatches transistors Q3 and Q4 in FIG. 8 and also furnishes a reset impulse for the alphabetic memory on the other ten bit modules. In this manner the entire circuit is reset and ready to take a new recording. The other part of this current flowing out through Book 1. 2, 4 in the form of a binary pulse flows directly to the three bit modules similar to those shown in FIG. 9, which record the book number desired.

The next step in operation is now to push one alphabetic key. If we, for instance, push the letter of A on the keyboard, this will connect the common C through the diode to letter 1 in FIG. 5. At the same time the pulse also goes through the common "Key Letter" to the wire of the same designation in FIG. 8. This pulse makes transistor Q2 conductive and gates Q4 and Q5, in FIG. 8, so that the signal from letter 1 will go through the same wire in FIG. 8, and will go to the first letter bit module as shown in FIG. 9. The pulse switch goes through "Any Letter" and is thus a gating pulse which selects between the wiring for the first or second letter. When the signal by means of gating pulse arrives at the bit module in FIG. 9 it will be stored for further use as described below. All motors are disabled until the release of the second key punch. The correct direction has been determined before the motors operate. As soon as it reaches a coding point on the film, it automatically compares the coding with the signal now recorded on the book bit module as shown in FIG. 9. If this direction coincides with the one desired for the new target, it will continue at high-speed. If it does not coincide, it will stop and reverse and will then hunt the new target at high-speed. When it reaches the area of the first letter, it will find an index, which the operator will read and then punch the second letter. The second letter will again go through the same way and will be gated by the transistors Q2 and Q5 so that it will enter the group of bit modules set aside for the purpose of recording the same.

It should be noted at this time that if information sought is simple, an index such as mentioned may be not be required, and it might not in fact require a second letter. In the present typical sample, however, the index is provided, and the operator, therefore, looks at same to find the second letter to be punched. The operation of the electronic circuit for finding the line desired is, therefore, as follows:

In FIG. 9 is shown the circuits of two bit modules which are typically of the 13 which make up the entire memory circuit. These bit modules are divided into three groups, and they are labeled Book 4-2-1, first letter 16-8-4-2-1, and second letter 16-8-4-2-1, in that order. Associated with each bit module is a photocell 30, see FIG. 3, that observes one bit of the code on the film. According to its relative position in the holder 29, the photocell will observe only bits of information coming in its location by means of the light transmitted from the lamp 32. Thus an illuminated cell will produce an output from Q1, FIG. 9, a dark cell will produce an output from Q2 in the same FIG. The transistor Q1 in the same FIG. has the ability to produce a "Forward" signal, and Q2 "Reverse." The transistors Q3 and Q4 are latching transistors, one which is always ON. The transistor Q3 when ON can inhibit the reverse signal, and Q4 can inhibit the forward signal.

With the closure of a numeric key, a 100 microseconds pulse, described above, is used to reset all the stages to inhibit the forward signal.

The current that continues to flow from a particular key, after the pulse is supplied to Q3 which conducts and inhibits the reverse signal for that stage. By this means stages will pass forward or reverse signals to make the film move to the location wherein the film code agrees with the present stage codes. When this condition occurs, the output from the stage ceases and control is passed to the next lower stage as follows:

When a forward or reverse signal is present in a stage, it flows through D4 or D3 to make Q5 conduct. This prevents any signal from entering terminals 8 or 9 from a lower stage. This action continues until the lower stage has completed control.

In FIG 10 is shown the circuits of the motor logic that controls the direction and speed of the film. The forward and reverse signals that enter "Rev." and "Fwd." are mixed with pulses that arise from the information that occurs between the code groups. To eliminate these spurious pulses, the following devices are used. One edge of the film that contains no information is made opaque except for small, clear portions 31, see FIG. 3, that occurs only adjacent to the code groups. These clear portions are not as wide as a code bit. They have the ability through their associated circuit to release code information only when the code is observed by the photocells. A photocell is associated with these clear portions which gate and feed the inverting amplifier Q1 and Q2, FIG. 10. An illuminated cell, gate ON, produces a signal from Q1. A dark cell produces a signal from Q2, same FIG. The outputs from the forward Q5—Q6, and reverse amplifiers Q3—Q4 are inhibited by transistors Q9 and Q10 when a dark gate exists. During the time that the gate is clear when a code group is being scanned, either a forward or a reverse signal will operate the latching transistors Q11—Q12 or Q13—Q14. A forward signal will turn off the reverse set Q11—Q12. A reverse signal will turn off the forward set Q13—Q14. A positive pulse applied to Q12—Q14 will turn off both sets. As a gate pulse occurs, and there is no forward or reverse signal at the outputs of Q4 or Q6, the transistor Q24 ceases to conduct, and the gate pulse that has been inhibited by same is now allowed to flow to Q15 to switch the system to low speed. The low-speed relay also transmits transmits this gate pulse the next time it occurs to Q12—Q14 as a stop order. When Q12 and Q-4 conduct, Q19 and Q20 are OFF, and the associated relays drop into the "OFF"or deenergized position that creates the stop or hold condition. In order to keep the motors from running until two punches have been made, the first punch opens a motor relay 54, and the second punch closes the same relay. The book reset pulse makes transistor Q18 conduct which turns off Q22 and the motor relay 54. The second punch turns on Q17 and also Q22 to operate the same relay.

It was shown that a gate pulse in the absence of a direction pulse would indicate an "ON target condition. Conversely, the absence of a direction and the absence of a gate pulse indicates that the film has not stopped in register or correct framing. To frame the film correctly, transistor Q23 goes "OFF" with the absence of a direction order. The resulting collected voltage is applied to transistor Q2, FIG. 10. This momentarily removes the inhibited action of Q9 and Q10. Any signal present causes the film to move at a slow speed. As soon as a code group is observed, correction takes place, and film moves to the target.

In FIG. 11 is shown a pair or double pole, double throw relays labeled "Forward" and "Reverse." In the normally OFF state the two clutches 41 and 45 are in series across the DC line. When either relay operates, one clutch is shorted out, and the other receives full voltage. FIG. 4 shows these clutches controlling the film direction from a unidirectional motor source. A low-speed motor is shown that is connected to the system by the low-speed clutch 52. It will be observed that when both clutches are ON, the film is pulled in opposite directions, and a stalled condition could result. By this arrangement, the film is kept taut at all times. The c same instant that the driving relay 54 goes OFF the motor supply voltage is removed, and both clutches go ON This serves as a brake and keeps the film taut. Thus the film can be reversed at high speed without causing a loose condition. A resistance $R_v$ may be introduced that will allow a small amount of current to flow in the inactive clutch to sustain some degree of drag when the film is moving, thus keeping it taut.

It should be noted that the present apparatus contains three power supplies, which furnish the required voltages from the common input. The switch 18 is a three-position switch which is OFF, MANUAL, and AUTOMATIC. To operate manual, it is only necessary to turn this switch.

The following represents a schematic instruction and explanation of how to operate the machine and what happens in each case:

1. A BOOK KEY. This will have the following result:
   a. Release low speed relay (53 and 54); low speed motor and low speed clutch 52—off.
   b. Erases prior number stored in memory bit modules and registers new book number.
2. PUNCH FIRST LETTER. This will register first letter code in bit modules.
3. PUNCH SECOND LETTER. This will have the following results:
   a. It registers second letter at storage.
   b. Upon release of second key punch, film starts in correct direction and will reverse in the event of target overshoot. The passing target will trigger the low speed relay. When the film arrives "on target" the stop relay will operate. If optical register is not correct, the film will be framed at low speed in either direction.
4. ON TARGET. This will automatically result in the following;
   a. operator reads INDEX, if present, or selects one of nine pages manually.

I claim:

1. A data storage and quick retrieval unit comprising in combination an alpha-numerical switch keyboard consisting of a first group of data input switches and associated operating keys and a second group of data input switches and associated operating keys, matrix means connected to said switches for converting data p input punched on the keys of the two groups into respective binary code bits to form a binary code word for each group, memory means connected to said matrix means consisting of a plurality of bit modules, one for each code bit fm forming such binary code words, a microfilm strip carrying successive formation areas with transverse binary-coded arrays of light and dark bit areas between the information areas, each bit area corresponding to one of said bit modules, optical projection means adjacent the microfilm strip arranged to project the information areas on a screen, respective photocells connected to said bit modules and arranged in a transverse row on one side of the microfilm strip adjacent to and aligned with the paths of movement of the bit areas, a lamp disposed transversely across the microfilm strip on the side thereof opposite said photocells, reversible drive means operatively connected to said microfilm strip, means to activate said drive means responsive to completion of first and second stages of data input comprising first actuating one of said first group of switches and then actuating one of said second group of switches, means to control the direction of said drive means after it has started in accordance with the response of the photocells connected to the bit modules forming the first binary coded word as the bit areas begin to pass over the photocells, and means to deactivate said drive means when the response of the array of photocells to an array of bit areas corresponds to the encoded bits of their associated bit modules.

2. The data storage and quick retrieval unit of claim 1, and wherein said drive means has a high speed mode and a low speed mode, said bit modules being operatively connected to said drive means, and means to place the drive means in said low speed mode and reverse the drive means when an array of bit areas on the film strip corresponding to said encoded bits of the bit modules passes beyond said photocells.

3. The data storage and quick retrieval unit of claim 1, wherein the drive means includes an electric motor and wherein said means to deactivate the drive means includes a frame registration bit area of reduced width at the end of each transverse binary-coded array, a gate photocell on said one side of the strip adjacent to and aligned with the path of movement of said frame registration bit area, stop relay means in circuit with said motor, and means to operate said stop relay means as a result of the response of said gate photocell to said frame registration bit area simultaneously with the response of said first-named photocells.

4. The data storage and quick retrieval unit of claim 3, wherein said frame registration bit area comprises a relatively narrow clear area on the side marginal portion of the film strip with dark areas of substantial length ahead and behind said clear area.

5. The data storage and quick retrieval unit of claim 3, and means to operate said stop relay means responsive to actuation of said one of said first group of switches at the first stage of data input.

6. The data storage and quick retrieval unit of claim 5, and means removing previously encoded bits from the other bit modules when the bit modules connected to the matrix means associated with said actuated one of the first group of switches are encoded.

7. The data storage and quick retrieval unit of claim 3, and means limiting the effective code-sensing action of said first-named photocells to positions of the film strip wherein said frame registration bit areas overly said gate photocell.

8. The data storage and quick retrieval unit of claim 1, and wherein said memory means includes a plurality of additional bit modules to receive bits forming a third binary code word responsive to a third stage of data input comprising actuating any one of said second group of switches subsequent to the second stage of data input, the arrays of bit areas on the film strip including bit areas respectively corresponding to said additional bit modules, respective photocells being included in said transverse row to sense said last-named bit areas, and means to further control the drive means in accordance with the response of said last-named photocells following said third stage of data input.

9. The data storage and quick retrieval unit of claim 8, and wherein said lamp comprises an elongated fluorescent lamp of sufficient length to cover all the photocells.